(12) United States Patent
Timms et al.

(10) Patent No.: US 11,859,699 B2
(45) Date of Patent: Jan. 2, 2024

(54) GEARED OVER TRAVEL STOP

(71) Applicant: Goodrich Actuation Systems Limited, West Midlands (GB)

(72) Inventors: Jack Timms, Wolverhampton (GB); Lee Slater, West Midlands (GB)

(73) Assignee: GOODRICH ACTUATION SYSTEMS LIMITED, West Midlands (GB)

( * ) Notice: Subject to any disclaimer, the term of this patent is extended or adjusted under 35 U.S.C. 154(b) by 178 days.

(21) Appl. No.: 17/550,024

(22) Filed: Dec. 14, 2021

(65) Prior Publication Data
US 2022/0196099 A1 Jun. 23, 2022

(30) Foreign Application Priority Data
Dec. 21, 2020 (EP) ..................................... 20275187

(51) Int. Cl.
*F16H 35/00* (2006.01)

(52) U.S. Cl.
CPC ....... *F16H 35/00* (2013.01); *F16H 2035/006* (2013.01)

(58) Field of Classification Search
CPC ............................ F16H 35/18; F16H 2035/006
See application file for complete search history.

(56) References Cited

U.S. PATENT DOCUMENTS

| | | | |
|---|---|---|---|
| 2,356,167 | A | 8/1944 | Mckelvey |
| 2,852,630 | A | 9/1958 | Burrows |
| 5,052,537 | A | 10/1991 | Tysver et al. |
| 5,133,440 | A | 7/1992 | Lang et al. |

FOREIGN PATENT DOCUMENTS

WO WO-0149553 A1 * 7/2001 ............. B62D 5/008

OTHER PUBLICATIONS

European Search Report for Application No. 20275187.1, dated Jun. 11, 2021, 13 pages.

* cited by examiner

*Primary Examiner* — Timothy Hannon
(74) *Attorney, Agent, or Firm* — CANTOR COLBURN LLP

(57) ABSTRACT

A system for stopping rotation of a first gear and a second gear on a shaft, The first gear and second gear are concentric and rotatable about said shaft. The first gear and the second gear are driven by the same input system and the first gear and the second gear are configured to rotate at differential speeds and independently to each other. The first gear comprises a first end stop and the second gear comprises a second end stop and the first end stop and the second end stop are configured to engage each other when the first gear and the second gear have each rotated a predetermined number of turns. Engagement of the first end stop with the second end stop is configured to prevent rotation of the first gear and the second gear and cause a stall in the system.

8 Claims, 4 Drawing Sheets

GEARED OVER TRAVEL STOP

CROSS-REFERENCE TO RELATED APPLICATIONS

This application claims priority to European Patent Application No. 20275187.1 filed Dec. 21, 2020, the entire contents of which is incorporated herein by reference.

TECHNICAL FIELD

The examples described herein relate to the field of over travel stops, and, in particular, to a geared over travel stop for a rotary device

BACKGROUND

Over travel stops are used in rotary transmission systems in situations wherein external envelope constraints require a mechanical stop to limit the amount of turns the transmission can take in either direction. In linear actuators that utilise a lead screw to generate axial movement, an over travel stop is provided by an acme screw thread that drives a nut in an axial direction between two hard stops that each limit travel of the nut. Disadvantages with such systems is that they can take up a lot of space, since the length of the thread must be long enough to allow for the number of rotations required for the full amount of turns. Furthermore, the end stops have a limited load capacity due to limited contact areas at the earthing surface. Over travel stops that rely on axial displacement along a thread do also not scale well with load or stroke requirements.

U.S. Pat. No. 2,356,167 relates to a system for controlling the rotation of two gears by using control members on each of the first and second gears. Cooperation of the first and second control members results in a longitudinal displacement of one of the gears that causes the gear to stop rotating.

U.S. Pat. No. 5,052,537 relates to a stopping mechanism for a rotating member by providing a follower member attached to the rotating member. Rotation of the rotating member causes the follower member to be axially moved into engagement with the fixed stop member in order to stop rotation of the rotating member.

U.S. Pat. No. 5,052,537 relates to a rotary stop mechanism for stopping the rotation of a shaft. A movable stop member is mounted to one of the gears on the shaft. Axial displacement of the moveable stop member from a first position to second position results in the moveable stop member engaging a fixed stop and stopping the rotation of the shaft.

SUMMARY

A system for stopping rotation of a first gear and a second gear on a shaft is described herein, comprising: the first gear; the second gear; and the shaft; wherein the first gear and the second gear are concentric and rotatable about said shaft; wherein the first gear and the second gear are driven by the same input system; wherein the first gear and the second gear are configured to rotate at differential speeds to each other; wherein the first gear comprises a first end stop and the second gear comprises a second end stop; and wherein the first end stop and the second end stop are configured to engage each other when the first gear and the second gear have each rotated a predetermined number of turns; and wherein engagement of the first end stop with the second end stop is configured to prevent rotation of the first gear and the second gear and cause a stall in the system.

In some examples the first gear may have a larger circumference than said second gear.

In some examples, the first end stop of the first gear may extend radially inwards from a circumferential edge of the first gear.

In some examples the second end stop may extend radially outwards form a circumferential edge of the second gear.

In some examples the first end stop and said second end stop are shaped and sized so as to be configured to interlock with each other when they engage each other.

In some examples one of either the first gear or said second gear is fixed to the shaft.

In some examples the engagement of the first end stop with the second end stop is mediated via an additional member.

A method for providing an over stop travel system on a gear system is also described herein. In some examples the method can be used to add an over stop travel system to an existing gear system. The method comprises providing a first gear and a second gear concentrically on a shaft so that the first gear and second gear are rotatable about said shaft; driving the first gear and the second gear with the same input system; configuring the first gear and the second gear to rotate about said shaft at different speeds to each other; providing a first end stop on said first gear and a second end stop on said second gear, and wherein the first end stop and the second end stop are configured to engage each other when the first gear and the second gear have each rotated a predetermined number of turns; and wherein engagement of the first end stop with the second end stop prevents rotation of the first gear and the second gear and causes a stall in the system.

DETAILED DESCRIPTION

Described herein is a system and method for an over travel stop mechanism that prevents a gear system from travelling past its design limits.

Figure 1:
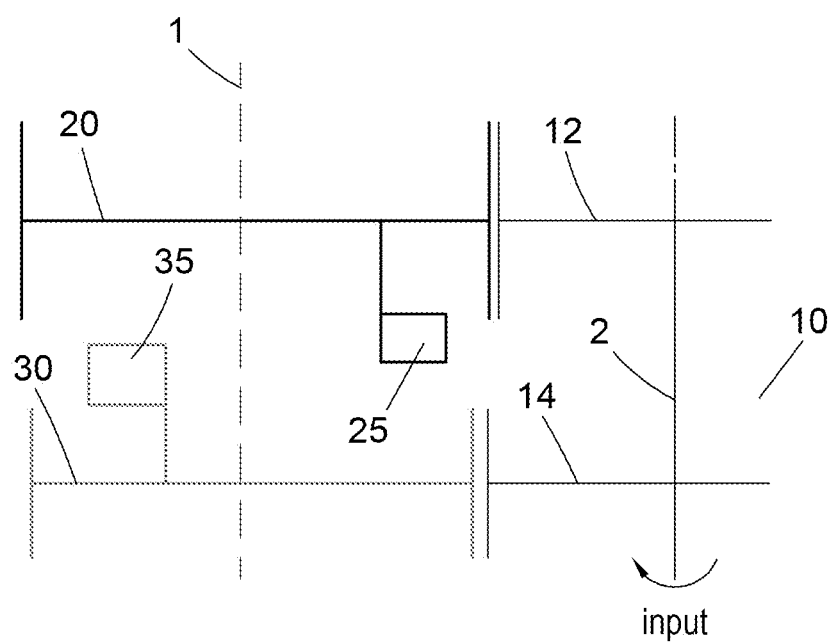
FIG. 1 shows a two-gear system with over travel stops.

A schematic of an over travel stop mechanism for a first gear 20 and a second gear 30 is shown in FIG. 1. The first gear 20 and the second gear 30 are concentric spur gears of differing sizes which are rotatable on shaft 1.

Each of the first gear 20 and the second gear 30 is run from an input gear 10 which is a single two-output spur gear. The first output 12 of the input gear 10 meshes with the first gear 20 and the second output 14 of the input gear 10 meshes with the second gear 30. The first output 12 and the second output 14 of the input gear 10 are each fixed on shaft 2 and therefore they rotate at the same speed. The first gear 20 rotates independently to the second gear 30. Optionally, one of either the first gear 20 or the second gear 30 can be configured to drive shaft 1 as a system output. When the single two-output spur gear 10 is turned, the first gear 20 and the second gear 30 will turn at a differential speed because the first gear 20 and the second gear 30 have differing sizes. The first gear 20 will turn in a first direction and the second gear 30 will also turn in the same, first direction.

A first end stop 25 is provided on the first gear 20 and a second end stop 35 is provided on the second gear 30. When the input gear 10 is turned, the first end stop 25 will move either towards or away from the second end stop 35, depending on the direction of input rotation. The first end stop 25 and the second end stop 35 are configured such that engagement between the first end stop 25 and the second end stop 35 will prevent further motion of the first gear 20 and the second gear 30 in the first direction. This prevents travel of the first gear 20 and the second gear 30 past their design limits. The system stalls upon engagement of the first end stop 25 with the second end stop 35 because the first gear 20 and the second gear 30 are driven by the same input gear 10.

Figure 2:
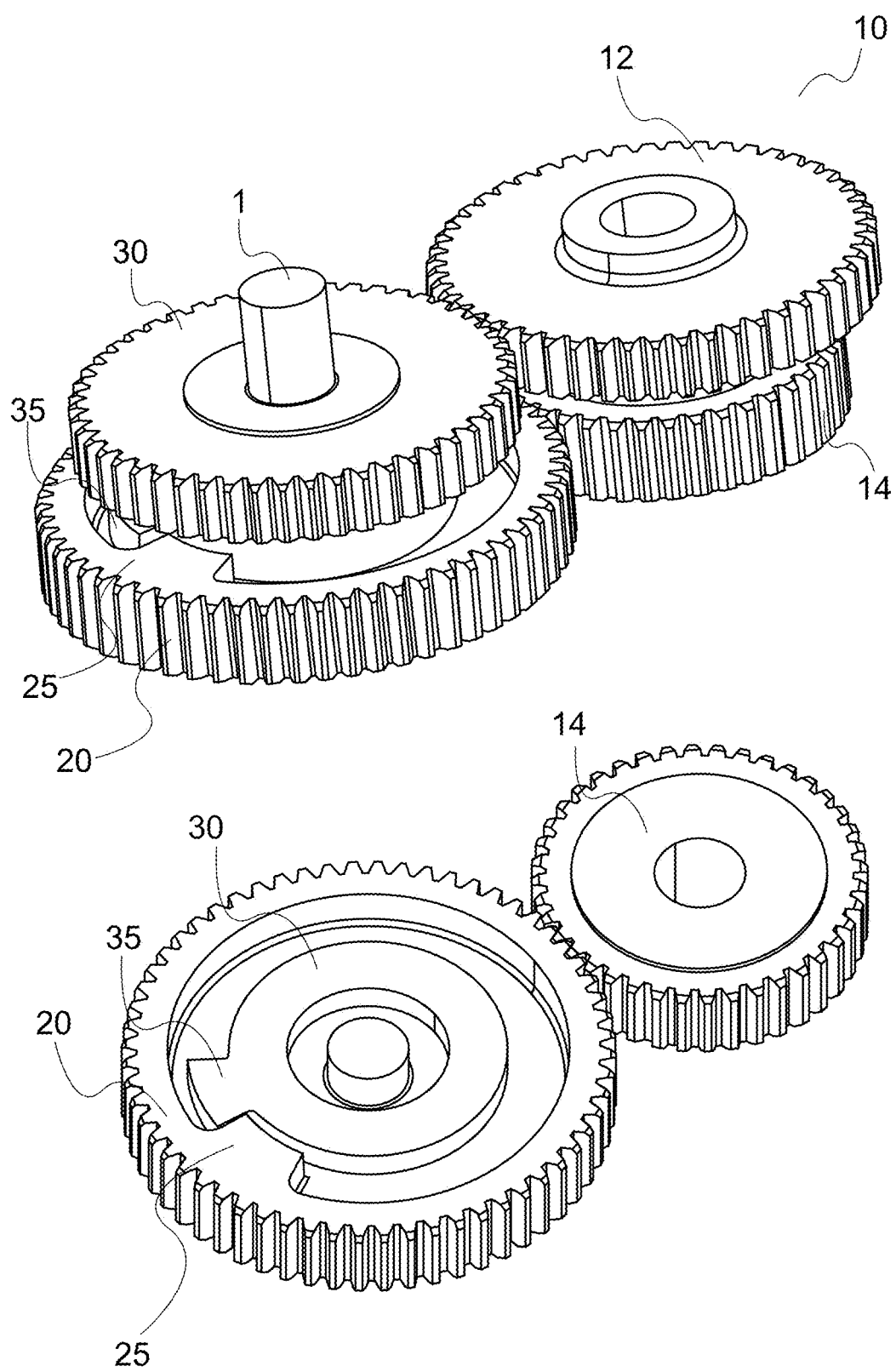
FIG. 2 shows a two-gear system with over travel stops.

The example shown in FIG. 2 is in accordance with the example shown in FIG. 1. FIG. 2 shows that the first gear 20 has a larger circumference than the second gear 30. The first end stop 25 of the first gear 20 extends radially inwards from the circumferential edge of the first gear 20. The second end stop 35 extends radially outwards form the circumferential edge of the second gear 30. The first end stop 25 and the second end stop 35 are therefore shaped and sized so as to be configured to interlock when they engage each other.

Other configurations of end stops are also envisaged. For example, any arrangement of end stops that are fixed to the gears and can engage each other directly through rotary engagement is envisaged.

Other systems are also envisaged wherein alongside the end stops, an additional member is provided. This additional member could be fixed to the gearing or translated via a frictional device (i.e. a clutch). Frictional devices are useful for high speed and high inertia systems because the dissipation of speed that results from engagement of the end stops can be controlled through an additional frictional device integrated into the end stops.

Figure 3:
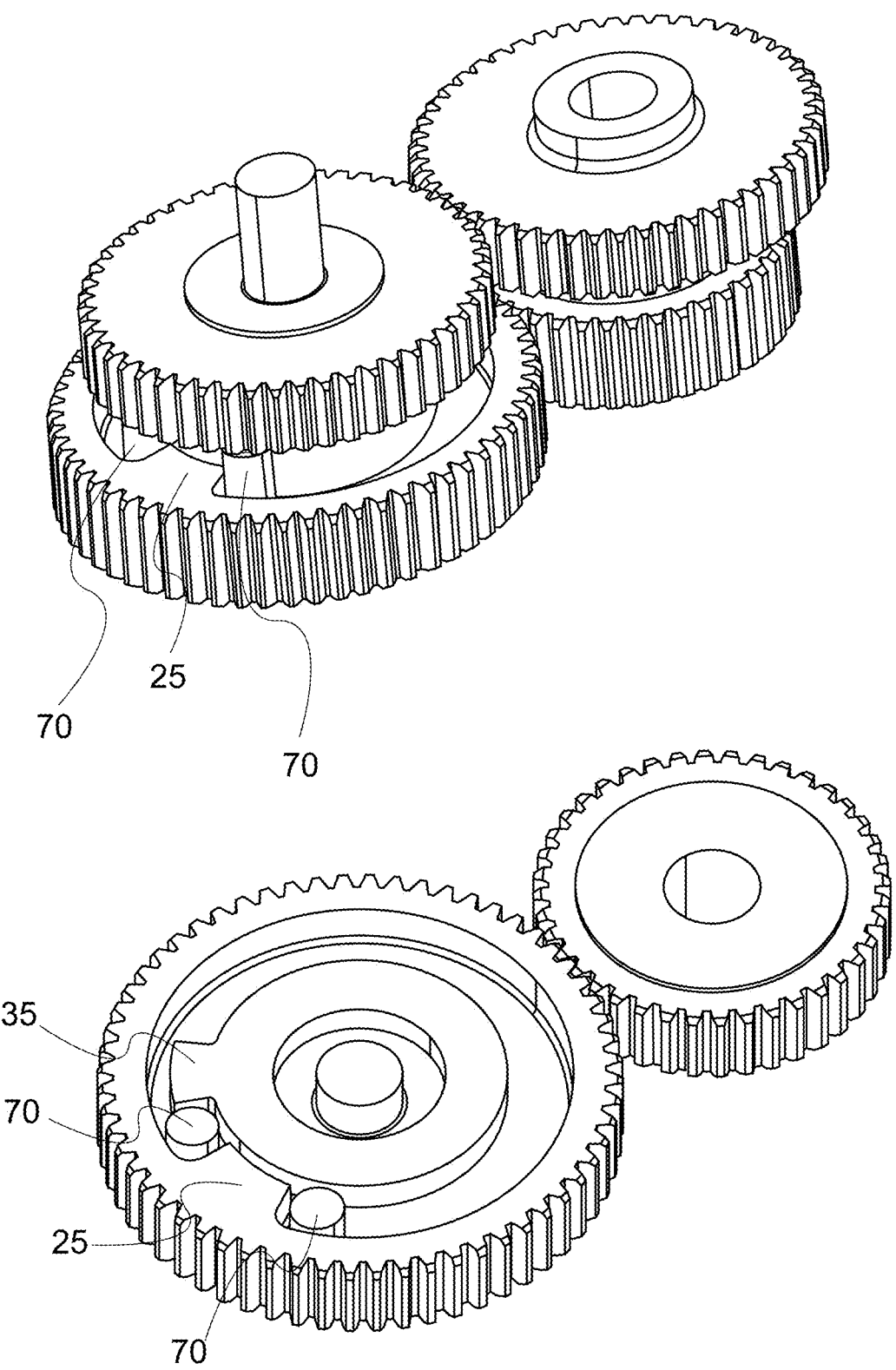
FIG. 3 shows a two-gear system with over travel stops and rollers.

In addition to, or as an alternative the above, a pin or roller 70 can be provided that is configured to sit between end stops, as shown in FIG. 3. FIG. 3 shows the system in accordance with the embodiment of FIG. 2 with the addition of two rollers 70 positioned on either side of the first end stop 25. When the first end stop 25 approaches the second end stop 35, the first end stop 25 and the second end stop will impact one of the rollers 70. The result of this is that the load distribution between the end stops will be altered and susceptibility to geometric tolerances will be removed.

The system described in accordance with FIGS. 1 and 2 can be adapted for different gear systems and is scalable for many load and stroke applications. In one example in accordance with FIGS. 1 and 2, the distance between the central rotational shaft 1 and the centre of the input gear 10 is 100 mm. The first gear 20 has a diameter of 52 mm and the second gear 30 has a diameter of 50 mm. The first end stop 25 and the second end stop 35 will move either together or apart by 27.7° per turn of the input gear 10, depending on the direction of the input turn. If the first end stop 25 and the second end stop 35 are initially set to be 180° apart, the total travel permitted would be 6.5 input turns before the first end stop 25 and the second end stop 35 engage each other.

In this same example, if the first end stop 25 and the second end stop 35 are set to be initially 300° apart, the total travel permitted would be 10.83 input turns.

In another example, the distance between the central rotational shaft 1 and the centre of the single two-output spur gear 10 is again 100 mm. The first gear 20 has a diameter of 82 mm and second gear 30 has a diameter of 80 mm. The first end stop 25 and the second end stop 35 will move either together or apart by 10.9° per input turn, depending on the direction of the input turn. If the first end stop 25 and the second end stop 35 are initially set to be 300° apart, the total travel permitted would be 27.5 turns.

Systems having other dimensions may also be envisaged.

In addition to, or as an alternative the above, other configurations are envisaged wherein more than one pair of stops are used for redundancy. In these configurations, the gears will comprise a plurality of end stops which are equally spaced around the gears.

Figure 4:
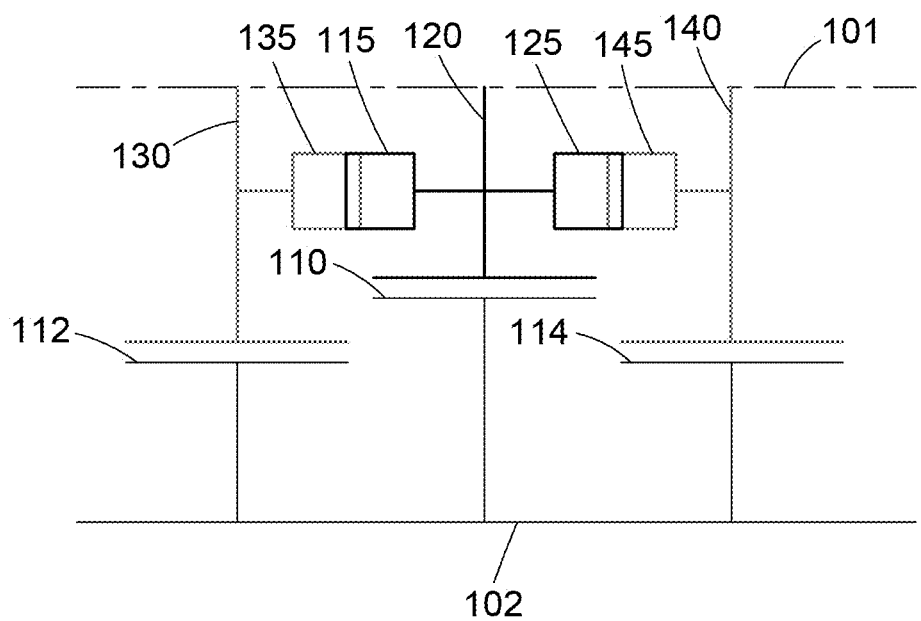
FIG. 4 shows a three-gear system with over travel stops.

FIG. 4 shows how the over travel stop mechanism can be provided for gears that are stacked in various configurations in order to create a higher load carrying capability. FIG. 4 shows a first gear 120 meshed with an input spur gear 110, a second gear 130 meshed with an input spur gear 112 and a third gear 140 meshed with an input spur gear 114. The first gear 120 comprises a first end stop 115 and a second end stop 125. The second gear 130 comprises a third end stop 135. The third gear 140 comprises a fourth end stop 145.

The input spur gears 110, 112 and 114 are fixed to the same shaft 102 so that they rotate at the same speed. The first gear 120, the second gear 130 and the third gear 140 can rotate independently of each other on shaft 101 and any one of the first gear, the second gear 130, or the third gear 140 can drive shaft 101 as a system output. Alternatively, the second gear 130 and the third gear 140 can be fixed to the shaft 101 and the first gear 120 can rotate independently of the second gear 130 and the third gear 140.

The gear system in FIG. 4 is configured such that the first gear 120 rotates at a differential speed to both the second gear 130 and the third gear 140. The second gear 130 and the third gear 140 rotate at the same speed. The gear system is further configured such that, when the first gear 120 has rotated in a first direction up to its design limit, the first end stop 115 engages the third end stop 135, and the second end stop 125 engages the fourth end stop 145 in order to stop further rotation of the first gear 120. The system stalls upon engagement of the end stops because the first gear 120, the second gear 130 and the third gear 140 are respectively driven by input gears 110, 112 and 114 that are all fixed to shaft 102.

The load carrying capability of the over travel stop mechanism can be further increased by reducing the gear tooth load. The load carrying capability can also be increased by reducing the load induced in the end stops.

Figure 5:
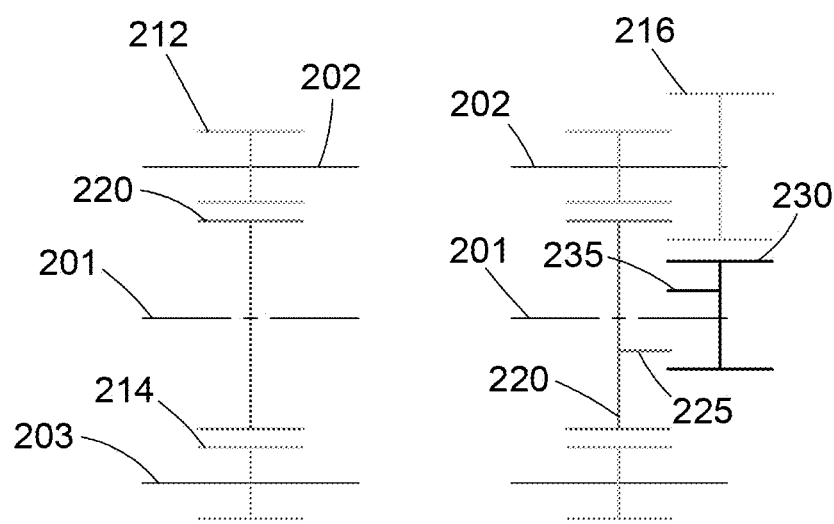
FIG. 5 shows how an existing gear system can be modified to incorporate an over travel stop.

The over stop travel system can be incorporated into existing gear boxes as shown in FIG. 5. The left panel of FIG. 5 shows a first gear 220 which is meshed with an input gear 212 and an output gear 214. The first gear 220 is rotatable on shaft 201, the input 212 gear is fixed to shaft 202 and the output gear 214 is rotatable on shaft 203. The input gear 212 rotates independently to the output gear 214.

The right panel of FIG. 5 shows the system of the left panel of FIG. 5 with the incorporation of an over travel stop system. All of the elements in the right panel of the FIG. 5 are identical to the left panel of FIG. 5 with the additional features of a first end stop 225 provided on the first gear 220, a second gear 230 provided on shaft 201 and second input gear 216 fixed to shaft 202. The second gear 230 is rotatable on shaft 201 and is provided with a second end stop 235. The first gear 220 rotates independently from the second gear 230. The second input gear 216 meshes with the second gear 230.

The system in the right panel of FIG. 5 can be configured such that, when the first gear 220 has rotated up to its design limit, the first end stop 225 engages the second end stop 235 in order to stop the motion of the first gear 220. The system stalls upon engagement of the end stops because the first gear 220 and the second gear 230 are respectively driven by the first input gear 212 and the second input gear 216 that are both fixed to shaft 202.

In all of the examples described herein, the stopping mechanism does not rely on an axially moving element. The stopping elements described herein are configured so that rotational movement of the stopping elements results in engagement of the end stops to prevent over travel of the gears. The design is therefore not affected by axial vibration characteristics which would be an issue for designs that rely of axially moving stopping elements.

The benefits of the above described over travel stop systems are that they are scalable for many load and stroke applications. In comparison to other over travel stop systems, the examples described herein are of low complexity which enables the cost and weight of the system to be reduced. Furthermore, a minimal space envelope is required because of the compact design. The over travel stop system can be incorporated into many gear mechanisms such as down drive gear boxes by installing a second pair of gears onto one set of existing gears. The over travel stop system is a low drag alternative to using other conventional mechanisms to create differential movement due to the low number of sliding surfaces.

Although this disclosure has been described in terms of preferred examples, it should be understood that these examples are illustrative only and that the claims are not limited to those examples. Those skilled in the art will be able to make modifications and alternatives in view of the disclosure which are contemplated as falling within the scope of the appended claims.

The invention claimed is:

1. A system for stopping rotation of a first gear and a second gear comprising:
    a shaft, the first gear and second gear being concentric and rotatable about said shaft;
    wherein the first gear and the second gear are driven by the same input system;
    wherein the first gear and the second gear are configured to rotate at different speeds and independently to each other;
    wherein the first gear comprises a first end stop and the second gear comprises a second end stop;
    wherein the first end stop and the second end stop are configured to engage each other when the first gear and the second gear have each rotated a predetermined number of turns;
    wherein engagement of the first end stop with the second end stop is configured to prevent rotation of the first gear and the second gear and cause a stall in the system;
    wherein said first end stop of the first gear extends radially inwards from a circumferential edge of the first gear, and
    wherein said second end stop extends radially outwards from a circumferential edge of the second gear.

2. The system of claim 1, wherein said first gear has a larger circumference than said second gear.

3. The system of claim 1, wherein said first end stop and said second end stop are shaped and sized so as to be configured to interlock with each other when they engage each other.

4. The system of claim 1, wherein engagement of the first end stop with the second end stop is mediated via an additional member; and
    wherein the additional member is a roller provided between the first end stop and the second end stop, or wherein the additional member is attached to either one of the first gear or the second gear.

5. A method for providing an over stop travel system on a gear system comprising:
    providing a first gear and a second gear concentrically on a shaft so that the first gear and second gear are rotatable about said shaft;
    driving the first gear and the second gear with the same input system;
    configuring the first gear and the second gear to rotate about said shaft at different speeds and independently to each other; and
    providing a first end stop on said first gear and a second end stop on said second gear, wherein the first end stop and the second end stop are configured to engage each other when the first gear and the second gear have each rotated a predetermined number of turns;
    wherein engagement of the first end stop with the second end stop prevents rotation of the first gear and the second gear and causes a stall in the system;
    wherein said first end stop of the first gear extends radially inwards from a circumferential edge of the first gear; and
    wherein said second end stop extends radially outwards form a circumferential edge of the second gear.

6. The method of claim 5, wherein said first gear has a larger circumference than said second gear.

7. The method of claim 5, wherein said first end stop and said second end stop are shaped and sized so as to be configured to interlock with each other when they engage each other.

8. The method of claim 5, wherein engagement of the first end stop with the second end stop is mediated via an additional member; and
    wherein the additional member is a roller provided between the first end stop and the second end stop, or wherein the additional member is attached to either one of the first gear or the second gear.

* * * * *